Figure 4:
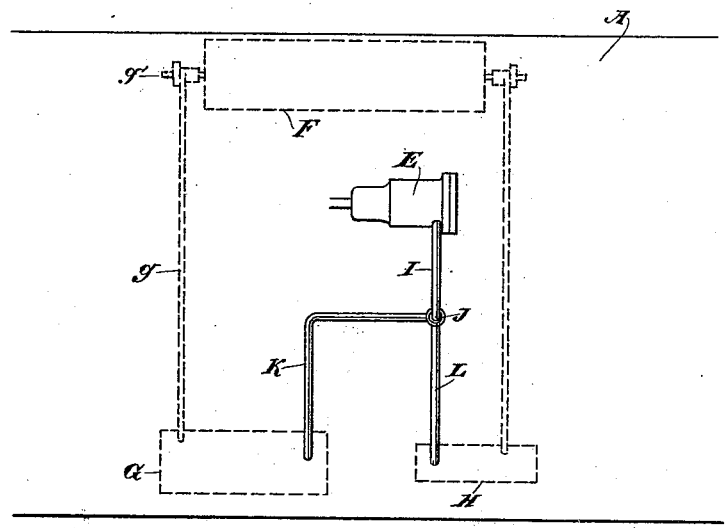

(No Model.) 2 Sheets—Sheet 1.
F. M. SPEED.
PNEUMATIC BRAKE.
No. 512,233. Patented Jan. 2, 1894.
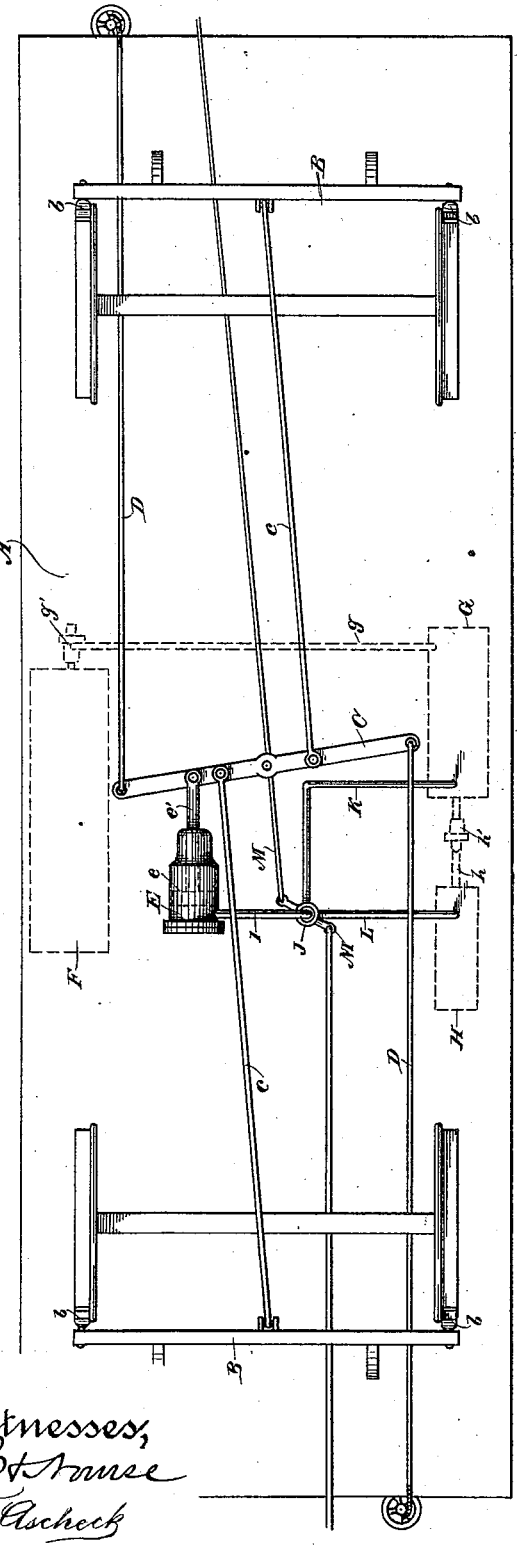
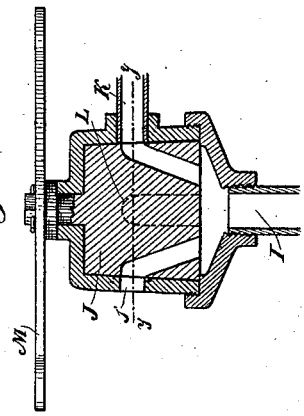
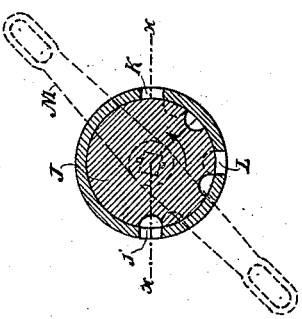
Witnesses:
Inventor,
Francis M. Speed
By Dewey & Co.
Attys (No Model.) 2 Sheets—Sheet 2.

F. M. SPEED.
PNEUMATIC BRAKE.

No. 512,233. Patented Jan. 2, 1894.

Witnesses, Inventor,
Francis M. Speed
By Dewey & Co.
attys.

THE NATIONAL LITHOGRAPHING COMPANY,
WASHINGTON, D. C.

UNITED STATES PATENT OFFICE.

FRANCIS M. SPEED, OF SAN FRANCISCO, CALIFORNIA, ASSIGNOR TO THE PNEUMATIC BRAKE COMPANY, OF SAME PLACE.

PNEUMATIC BRAKE.

SPECIFICATION forming part of Letters Patent No. 512,233, dated January 2, 1894.

Application filed January 6, 1893. Serial No. 457,539. (No model.)

*To all whom it may concern:*

Be it known that I, FRANCIS M. SPEED, a citizen of the United States, residing in the city and county of San Francisco, State of California, have invented an Improvement in Pneumatic Brakes; and I hereby declare the following to be a full, clear, and exact description of the same.

My invention relates to the class of pneumatic brakes applicable to street cars, and more particularly such as are propelled by electric power or cables.

My invention consists in the combination on a car of a braking mechanism, a brake cylinder connected with and operating said braking mechanism, a main reservoir in which air under high pressure may be stored, supplementary reservoirs adapted to receive air under different pressures, outlets from said supplementary reservoirs connected with the brake cylinder and a multiple-way cock common to all said outlets, whereby air under different pressures may be admitted to the brake cylinder.

My invention also consists in the novel arrangement of parts and their combinations hereinafter fully described and specifically pointed out in the claims.

The object of my invention is to effect an efficient, safe and economical use of compressed air for the purpose of applying brakes, whereby a quantity of air previously compressed to a high degree by a stationary compressor located at the power, or other central or convenient station, may be injected into a reservoir carried on the car and stored therein under high degree of compression, and used therefrom at such degree of compression and in such quantity only, as is required to perform the work without waste, the main purpose of such economical use being to permit the employment of reservoirs of such capacity as may be conveniently carried on the car, and yet hold air enough under high compression to last a long time, used under a lower degree, without frequent refilling; and further to use said air with improved mechanism in such manner as to avoid sudden and excessive applications of the brakes when not necessary to do so, and yet to have in reserve a store of air more highly compressed which may be instantly applied by said mechanism in cases of emergency.

Referring to the accompanying drawings for a more complete explanation of my invention,—Figure 1 is a bottom view of a car showing a braking appliance, and, in dotted lines, showing the air reservoirs and their connections. Fig. 2 is a horizontal section, on the line *y—y* of Fig. 3, and Fig. 3 is a vertical section on the line *x—x* of Fig. 2 of the multiple-way admission cock to the brake cylinder. Fig. 4 is a view showing each of the supplementary reservoirs connected with the main reservoir.

Under the car A I have here shown a simple and common form of brake mechanism, which, in the present instance may represent any suitable braking appliance to be used on the car. The brake mechanism, in this case, consists of the brake beams B carrying the brake shoes *b*, said beams being operated from the pivoted lever C through connecting links *c*. This lever C may be operated as usual by the connections D with the hand brakes, and also by means of the rod *e'* of the piston *e* working in the brake cylinder E.

In any suitable and convenient position upon the car, as, for example, under the seat, is located the main reservoir F. In connection with this main reservoir I employ intermediate or supplementary reservoirs, which receive air under different pressures, said reservoirs being connected with the brake cylinder with an intermediate admission valve common to all, whereby air of various degrees of compression may be admitted to the brake cylinder and the brakes applied with such force as may be requisite; less when the track is level, the load light or the momentum little; more when the reverse is the case. I have accordingly herein shown, for example, two of these supplementary reservoirs. One of these, G, is connected with the main reservoir by a pipe *g* including a suitable reducing valve at *g'*. The other of these, H, is connected with reservoir G by a pipe *h* including a reducing valve *h'*.

I is a pipe which communicates with the brake cylinder E. In this pipe is a multiple-way cock J which controls a communicating pipe K with reservoir G, and a communicating pipe L with reservoir H, and also controls the exhaust *j* from the brake cylinder to the outer air.

The operation of this apparatus is as follows: The main reservoir F is filled with air compressed to a high degree, say, for the purposes of example, to three hundred pounds per square inch. It may be supplied with this air from any suitable source, as, for example, from a store of highly compressed air at the power house of the road, or other central station, where the work of compression can be economically performed. The reservoir F receives its charge from the main supply at such times as may be necessary, and through suitable connections unnecessary to describe. The air from this reservoir passing through pipe $g$ is reduced by the valve $g'$ therein to such pressure as may be desired in the reservoir G, say, for example, to a pressure of sixty pounds, and thence the air from reservoir G passing through pipe $h$ is reduced by valve $h'$ to a still lower pressure in reservoir H, say, for example, to a pressure of thirty pounds.

The multiple way-cock J is operated by suitable means under the control of the motor man, as, for example, by the lever connections M. In the first or idle position of this cock, the pipes from the reservoirs G and H are closed, while the exhaust is open. In its second position it closes the exhaust port $j$ and opens the pipe L leading from reservoir H, and air is admitted from the reservoir H to the brake cylinder E, said air being under a pressure of thirty pounds per square inch, assumed in this case to be a sufficient pressure to move the brake cylinder piston, take up the slack in the several brake rods, levers and shoes, and under ordinary circumstances to stop the car. By a second movement of the multiple-way cock to its third position, the pipe L from reservoir H is closed and the pipe K from reservoir G is opened. Air is thus admitted to the brake cylinder E (already full, under a pressure of thirty pounds per square inch) from the reservoir G, under a pressure of sixty pounds per square inch which increased pressure sets the brake, presumably in this case with a maximum force, the latter being for use only in cases of emergency when a sudden stop is rendered necessary to avoid accidents or for other reasons.

The pressures herein given are for illustration only. It is evident that the principle of this part of my invention being the application of air of different pressures, by the use of more than one supplementary reservoir lower, higher or intermediate pressures may be applied, as required. Though the supplementary reservoirs are herein described as being in series from the main reservoir, that is, connected with each other, it is evident that they may be connected in multiple, that is, each connected with the main reservoir, and accomplish the same result. This I have shown in Fig. 4. It will thus be seen that, as a rule, air of low pressure is used, and the unnecessary use of highly compressed air avoided. Thus a supply of air necessary for a long period of time can be carried by the car by storing it in a reservoir thereon under high pressure, and used under a lower pressure as required, under varying conditions, for the purpose of operating the brakes. The supplying of the air under high pressure to the main reservoir from stationary reservoirs is economical, in that the work necessary to effect the compression is part of the work of the steam engine, or other initial motors in the power house and is not work taken from the immediate propelling power of the car as is the case where the air is compressed by a separate motor on the car or by means of a connection with its axles.

In the particular arrangement of reservoirs and appliances described, the graduated force with which the brakes are applied is of advantage in that the steps necessary to effect it are successive and mechanically controlled.

Having thus described my invention, what I claim as new, and desire to secure by Letters Patent, is—

1. A pneumatic braking apparatus for cars, consisting of the combination, on the car, of a suitable braking appliance, a brake cylinder with connections for operating said appliance, a main reservoir adapted to store air under a high degree of compression, supplementary reservoirs adapted to receive air from the main reservoir which is stored in said supplementary reservoirs at different pressures, pipe outlets from said supplementary reservoirs, an admission cock common to all of said outlets and a pipe from said cock to the brake cylinder, whereby air of different pressures may be admitted to the brake cylinder from the supplementary reservoirs, substantially as herein described.

2. A pneumatic braking apparatus for cars, consisting of the combination, on the car, of a suitable braking appliance, a brake cylinder with connections for operating said appliance, a main reservoir adapted to store air under a high degree of compression, supplementary reservoirs, pipes connecting the main reservoir with each of the supplementary reservoirs, said pipes having reducing valves arranged to supply air under different pressures from the main to the supplementary reservoirs, pipe outlets from said supplementary reservoirs, an admission cock common to all of said outlets and a pipe from said cock to the brake cylinder, whereby air of different pressures may be admitted to the brake cylinder from the supplementary reservoirs, substantially as herein described.

In witness whereof I have hereunto set my hand.

FRANCIS M. SPEED.

Witnesses:
S. H. NOURSE,
WM. F. BOOTH.